United States Patent [19]
Alderman et al.

[11] 3,806,598

[45] Apr. 23, 1974

[54] METHOD OF CONTROLLING GASTROPODS

[75] Inventors: John F. Alderman, Long Valley, N.J.; Paul H. Schuldt, Mentor, Ohio

[73] Assignee: Diamond Shamrock Corporation, Cleveland, Ohio

[22] Filed: June 13, 1973

[21] Appl. No.: 369,604

[52] U.S. Cl. .............................................. 424/275
[51] Int. Cl. ............................................ A61k 27/00
[58] Field of Search .................................... 424/275

[56] References Cited
UNITED STATES PATENTS 3,073,691    1/1963    Bluestone ........................... 71/2.5
3,364,233    1/1968    Hauptschein ..................... 260/332.5
3,666,773    5/1972    Baker................................. 424/275

Primary Examiner—Sam Rosen
Attorney, Agent, or Firm—Theodore J. Dettling

[57] ABSTRACT

Gastropods, including the vectors of parasitic flukes that afflict man and animals, are controlled by exposing such gastropods or their eggs to an amount of a polychlorothiopheneoxide sufficient to kill the gastropods or to prevent the eggs from hatching.

23 Claims, No Drawings

METHOD OF CONTROLLING GASTROPODS

BACKGROUND OF THE INVENTION

This invention relates generally to the chemical control of gastropods, including the vectors (intermediate snail hosts) of parasitic flukes that infect man and animals, and in particular, to the control of the gastropod vectors of blood flukes or schistosomes that find their way into and lodge in the body of man and cause the debilitating and eventually fatal disease known as schistosomiasis or bilharziasis.

Schistosomiasis afflicts an estimated two to three hundred million human beings in the tropical and subtropical regions of the world and causes about six million deaths per year, thus making it one of the major scourges of mankind. The principal causes of schistosomiasis are *Schistosoma haemotobium*, *Schistosoma mansoni* and *Schistosoma japonicum*, the three major species of parasitic flatworms, commonly referred to as schistosomes, that lodge and propogate in the circulatory system of man wherein they can live for up to 7 years causing, principally because of the egg masses laid therein, blockage and inflammation of the blood vessels which in turn gives rise to degeneration of tissue, infection, and damage to vital organs.

Schistosomes gain entrance into man via a free-swimming, fork-tailed second larva-form of the schistosome, called cercaria, that is capable of penetrating the skin or mucous membrane and commonly infests fresh water sources to which man is exposed. The cercariae are propogated from schistosome eggs excreted by man that find their way into the fresh water sources where they hatch to form a first larval stage, called miracidia, that attack and infect certain species of snails (class Gastropoda) where the second larval state (cercaria) is formed. Thus, such snails are the intermediate hosts in the life cycle of the schistosome parasite. While there is not yet unanimity with respect to the species of gastropods that act as carriers or vectors for schistosomes and hence the disease schistosomiasis, the species and the endemic areas of many have been identified, as shown in the compilation on pages 14 and 15 of the monograph entitled "Snail Control in the Prevention of Bilharziasis" published in 1965 by the World Health Organization.

While schistosomiasis may be combatted and controlled by medication of afflicted individuals or provision of clean water supplies through improved sanitation and hygiene, these methods are difficult and often impractical to achieve and hence are generally ineffective. Thus, the main emphasis on schistosomiasis control has been directed to greatly reducing the number of, and if possible, completely eradicating the snail intermediate host inhabiting water sources to which man is exposed. In this approach, the chemical control of the intermediate-host snail by the use of compounds, called gastropodicides, capable of killing either the immature or mature snail, or the use of compounds called ovicides, that kill or prevent the hatching of the snail eggs has been one the principal means employed. Additionally, some of these gastropodicides prevent schistosomiasis because they are cercaricidal, killing the schistosome cercariae at the concentrations used to kill the snails.

In addition to schistosomiasis, there is a multitude of other diseases of man and animals that are caused by flukes which reside at one stage of their life in gastropod hosts. Generally these flukes are divided for convenience into the following four groups: (1) the blood flukes or shistosomes hereinbefore described, (2) the lung flukes, (3) the liver flukes, and (4) the intestinal flukes. These diseases are well known and documented in the literature as shown, for example, by the disclosure on pages 69 and 70 of the book "Mollusks" by Paul Bartsch, first published in 1968 by Dover Publications,Inc. and the disclosure in Chapters 12, 13 and 14 of "Introduction to Parasitology" — 10th edition, by Chandler & Reed. These references describe parasitic flukes causing these four classes of diseases, their geographical distribution, their gastropod vectors, and finally their principal victims. Both of these texts are incorporated herein by reference for these teachings to illustrate gastropods that are vectors of flukes parasitic to man and animals which may be controlled by the invention methods hereinafter described and claimed.

Other gastropods are responsible for causing extensive agricultural and horticultural damage, and consequently new gastropodicides are continually being sought which can either replace or augment with advantage man's efforts to either eradicate or control these destructive gastropods. Illustrative of such gastropods that may be controlled by the methods of this invention are those classified in the order Pulmonata and include such amphibious and terrestrial snail pests as *Achatina fulica*, *T. pisana*, *Helix aspersa*, *Oxychilus cellarius*, *Milox sowerbii*, and *Deroceras reticulum*.

Illustrative of gastropodicides that are widely used at the present time are copper sulfate, sodium pentachlorophenate, copper pentachlorophenate, the ethanolamine salt of 5, 2'-dichloro-4'-nitrosalicylanilide, N-trityl morpholine, tributyltin acetate, arsenate salts and metaldehyde. While generally effective in varying degrees as gastropodicides all exhibit one or more of the following deficiencies; nonovicidal, noncercaricidal, corrosive, unstable in storage, reduced effectiveness in hard water or water having high acidity or alkalinity, ineffective when used either on dry or wet soil (the normal habitat for many gastropods) or not environmentally degradable within a reasonable period so as to minimize undesired cumulative toxication of the environment.

SUMMARY OF THE INVENTION

Considering these deficiencies of presently known and used gastropodicides, it is a general object of this invention to provide a method of controlling gastropods including vectors of parasitic flukes and in particular, vectors of schistosomes that either does not have or exhibits to a reduced extent, the deficiencies of methods resulting from the use of presently available gastropodicides.

Specifically, it is an object of this invention to provide a method of controlling gastropods by the use of gastropodicides that: are not only toxic to snails, but also kill snail eggs and schistosome cercariae at subgastropodicidal concentrations; are stable in storage and noncorrosive to containers and apparatus used to store and spread them; are capable of killing amphibious and terrestrial gastropods; and finally, are not persistant, thus decreasing cumulative toxication of the environment in which they are used.

It has been discovered that these objects and other desirable advantages, hereinafter described, can be obtained by exposing gastropods to a gastropodicidal quantity of a polychlorothiopheneoxide compound or mixture of compounds having the general formula

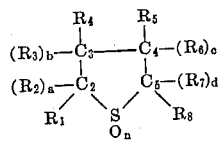

wherein: $R_1$, $R_2$, $R_3$, $R_4$, $R_5$, $R_6$, $R_7$ and $R_8$ are hydrogen or chlorine radicals and at least two of these R substituents are chlorine radicals: $n$ is 1 or 2; $a$, $b$ and $c$ are 0 or 1; the sum of $a$, $b$, $c$ and $d$ is 0, 2 or 4; when the sum of $a$, $b$, $c$, and $d$ is 2 there is a double bond either between $C_3$ and $C_4$ or between $C_4$ and $C_5$; and when the sum of $a$, $b$, $c$ and $d$ is 0 there are double bonds between $C_2$ and $C_3$ and between $C_4$ and $C_5$. Alternatively gastropods can be controlled by exposing gastropod eggs to an ovicidal quantity of a polychlorothiopheneoxide compound having the above general formula.

DESCRIPTION OF THE PREFERRED EMBODIMENTS

Illustrative of polychlorothiopheneoxide compounds coming within the scope of this general formula that may be used in the practices of this invention are those described hereinafter in Examples 1 to 13.

The synthesis of and prior art uses known for the polychlorothiopheneoxide compounds employed in the method of this invention, except for the polychloro-2,5-dihydrothiophene-1,1-dixoide compounds, are described in U.S. Pat. Nos. 2,898,205, 2,957,887, 2,975,194, 2,976,297 and 3,073,692 and German Provisional Publication 2,048,239. These references, while teaching that the polychlorothiopheneoxide compounds exhibit biological activity that makes them useful as fungicides, bactericides, miticides, insecticides, a nematocide, herbicides and seed protectants contain no teachings that would lead one to believe that they would be gastropodicidal. It was surprising that the polychlorothiopheneoxide compounds should function so efectively as a gastropodicide in view of the failure of a multitude of other known compounds having one or more of the aforedescribed biological properties to control gastropods at useful levels.

The polychloro-2,5-dihydrothiophene-1,1-dioxide compounds were prepared as follows:

Preparation of 2,3,4-trichloro-2,5-dihydrothiophene-1,1-dixoide

An agitated solution of 10 grams of 3,3,4-trichloro-2,3-dihydrothiophene-1,1-dioxide in 100 milliliters of chloroform and 100 milliliters of carbon tetrachloride was irradiated with a Hanovia No. 8A1 ultraviolet light in a quartz immersion well while 10 grams of chlorine was bubbled in over a 1 hour period at a temperature ranging from 26° to 42° C. After evaporation, there was obtained 12.5 grams of a light yellow solid that yielded, after being recrystallized once from a decolorizing charcoal-treated carbon tetrachloride solution and three times from a methanol-water mixture, 4.0 grams of a pure product melting at 106°–107°C. and having an elemental analysis and infrared spectrum consistent with the expected 3,3,4-trichloro-2,5-dihydrothiophene-1,1-dioxide reaction product.

Preparation of 2,3,4,5-tetrachloro-2,5-dihydrothiophene-1,1-dioxide

An agitated solution of 111 grams of 3,4-dichlorothiophene-1,1-dioxide in 1,500 milliliters of chloroform maintained at 30° to 41°C. was irradiated with two 15-watt G.E. blue fluorescent lamps having reflectors while bubbling in 274 grams of chlorine over about a 3-hour period. The irradiated solution was evaporated to dryness and the resulting reaction solids slurried with isopropanol and transferred to a filter paper where they were washed with petroleum ether and dried. There was obtained 43.1 grams of a crude product that yielded, after being recrystallized twice from methanol, 30.4 grams of a pure product melting with decomposition at 113° to 114°C. and having an elemental analysis and infrared spectrum consistent with the expected 2,3,4,5-tetrachloro-2,5-dihydrothiophene-1,1-dioxide reaction product.

In the invention method, the polychlorothiopheneoxide compound is distributed about the habitat of the gastropods in a physical form and concentration that will expose the gastropods to be controlled to a gastropodicidal concentration of the compound. When this control is to be effected by preventing the gastropod eggs from hatching, then a lesser ovidical quantity of the polychlorothiopheneoxide compound can be used.

The quantity of polychlorothiopheneoxide required for every situation cannot be precisely delineated because, as will be apparent to those skilled in the art, it is related to a number of variable factors such as: the species, age and hardiness of the snail; the desired quickness of kill; the temperature, pH, mineral content, and extent of flow of the water habitat of aquatic gastropods; the temperature, relative humidity and moisture content of the earthen habitat of terrestrial or amphibious gastropods, the physical form and particle size of the compound; and so forth. In laboratory evaluations of the effectiveness of 3,3,4,4-tetrachlorotetrahydrothiophene-1,1-dioxide against laboratory-cultured *Biomphalaria glabrata*, employing the procedure described in the article "Molluscicide Screening and Evaluation" appearing in the Bulletin of the World Health Organization 1965, 33, 567–581, it was determined that this particular polychlorothiopheneoxide had an $LD_{90}$ of 20 ppm-hr and an $LC_{90}$ of 3 ppm-24 hours. Further, it was observed that eggs of this snail species when exposed 24 hours to concentrations of this compound as low as 0.1 ppm. failed to hatch after 18 days. Since such eggs normally hatch within 9 to 12 days, this indicates that the polychlorothiopheneoxides are ovicidal at this concentration. Based on these results, it is believed that even lower concentrations would be ovicidal if the eggs were exposed to the toxicant for longer periods.

Additionally, other laboratory evaluations established that 3,3,4,4-tetrachlorotetrahydrothiophene-1,1-dioxide at a concentration of 0.1 ppm. killed all of the cercariae of *Gigantobilharzia huronensis* (Swimmer's Itch) shed from infected *Physa gyrina* snail hosts within 40 minutes. More rapid kills could be achieved by increasing the concentration of the compound. The cerceriae of other parasitic flukes, likewise, would, based on these results, be expected to be killed by the polychlorothiopheneoxide compounds.

In these tests and the following Examples, the schistosome snail vector, *Biomphalaria glabrata* was chosen because it is considered to be one of the more difficult species of aquatic snails to eradicate by chemical means being, on the whole, more resistant to presently used gastropodicides than the majority of other aquatic schistosome snail vectors of principal concern to public health organizations. Based on experience with these other gastropodicides, it is expected that, usually, the polychlorothiopheneoxide compounds will be gastropodicidal against other aquatic schistosome snail vectors at lower concentrations than the lethal concentrations required for *Biomphalaria glabrata*.

In these laboratory tests and the following Examples, aqueous solutions of the 3,3,4,4-tetrachlorotetrahydrothiophene-1,1-dioxide prepared from either a dilute acetone solution or a dilute dimethylsulfoxide solution of the compound were utilized. In practicing the invention in the field the polychlorothiopheneoxide may be distributed about the habitat of the gastropod to be controlled in the form of: an aqueous solution of the toxicant such as employed in the laboratory tests and Examples, an emulsified organic solvent solution of the toxicant, an aqueous dispersion of finely-ground toxicant, finely-ground toxicant dust, a wettable, finely-ground toxicant powder, a toxicant bait, or water-soluble or water-leachable pellets. As known to those skilled in the art, all of these forms of the gastropodicide compositions may contain one or more of the following kinds of adjuvants: surfactants to promote the dispersion, wettability, or emulsification of the gastropodicide composition; defoamers; colloidal stabilizers; thickening agents; solvents; liquid or solid diluting carriers; water-soluble or water-swellable binders; and snail attractants. The prior art is replete with examples of these adjuvants, as for example, the disclosures contained in U.S. Pat. Nos. 3,079,297, 3,168,437, 3,331,735 and 3,375,160 that are incorporated herein by reference for these teachings.

Additionally, as will be apparent to those skilled in the art, the gastropodicidal and ovicidal effectiveness of the polychlorothiopheneoxide compounds used as dry powders or as aqueous dispersions is maximized when they are finely comminuted. Generally good gastropodicidal activity is obtained when the polychlorothiopheneoxide compounds have an average particle size of about 5 microns or less, with an average particle size of about 2 microns or less being preferred for maximum efficacy.

Depending on the mode of application, and hence form, of the gastropodicidal composition that is used, the gastropodicidal composition may contain anywhere from essentially no adjuvants up to about 99% adjuvants. Consequently, the gastropodicide compositions employed in the method of this invention could contain anywhere from 1 to 100% of the active polychlorothiopheneoxide component.

While the advantages of using polychlorothiopheneoxide for the control of gastropods are maximized by using gastropodicidal compositions containing only polychlorothiopheneoxide compounds as active ingredients, there may be instances when, to achieve certain results, it may be desirable or necessary to employ gastropodicide compositions containing one or more other types of gastropodicidal compounds. The proportion of such other gastropodicides to the polychlorothiopheneoxides may vary widely depending upon the composition aand activity of the other gastropodicides employed and the results that are desired. Generally, however, the polychlorothiopheneoxide should constitute at least 10% by weight, and preferably 50% or more, of the active ingredients in such combination gastropodicide compositions, if it is desired to retain to a significant extent the improved characteristics and advantages of the invention.

In utilizing the gastropodicide compositions containing polychlorothiopheneoxides in the field, different modes of applications may be employed, depending on the results desired and the environment of the snail's habitat as hereinbefore described. The application of the invention gastropodicides to the snail's habitat may be intermittent or continuous and may employ any of the application methods utilized to dispense insecticides and fungicides. Maximum efficiency in gastropod control is realized when the polychlorothiopheneoxide compound is utilized in water, due to the more homogeneous distribution obtained, and consequently, distribution in water habitats is preferred whenever possible. In the case of terrestrial snails and amphibious snails living out of water, the polychlorothiopheneoxide should be spread as uniformly and in as fine a particle size as possible over the preferred habitat of the snails to achieve most efficient control. Alternatively, land snails often may best be controlled by the use of attractant baits incorporating the polychlorothiopheneoxide gastropodicides. The many ramifications dictating the time, quantity, and method of applying gastropodicides to the habitats of gastropods are well known and documented, as shown for example in U.S. Pat. No. 3,577,550, in the World Health Organization's 1965 monograph "Snail Control in the Prevention of Bilharziasis", and in the article "Molluscicide Screening and Evaluation", supra, which are incorporated herein by reference for these teachings.

In addition to these conventional methods of distributing the polychlorothiopheneoxide compounds about the gastropod's habitat, aforedescribed, they may also advantageously be incorporated into rubber compositions which are capable of releasing the polychlorothiopheneoxide compound slowly into the environment of the gastropod over an extended period.

Generally, the types of rubber, compounding ingredients, and states of cure are chosen so that the polychlorothiopheneoxide compound will be soluble in the rubber composition at the concentration desired to be used and will be continuously released therefrom for an extended period. Depending upon these parameters and the length of time over which the rubber composition is to be active, typically, there can be incorporated anywhere from about 1 up to about 50 parts by weight of the polychlorothiopheneoxide per 100 parts by weight of the rubber(s) (phr) used in the compositions. However, for most applications a minimum of about 5 phr of the gastropodicide is used to insure that the rubber composition will be active for reasonable periods while the maximum used will generally be about 20 to 25 phr — the maximum solubility of the polychlorothiopheneoxide in many rubbers. In some instances however, it may be desirable to exceed the solubility limit, as for example, when it is necessary to release a larger quantity of the gastropodicide immediately after distribution of the rubber composition in and about the habitat of the gastropod so as to effect more rapid gastropod kills.

When the solubility limit in the rubber composition has been exceeded, the insoluble fraction of the polychlorothiopheneoxide will be noted to migrate at normal ambient temperatures to the surface of the composition forming a bloom within a short period, usually 1 to 3 weeks. When a more precise method of determining solubility is deemed necessary, then microtome sections of the rubber composition made about one or two weeks after it has been compounded and cured, can be subjected to X-Ray diffraction analysis. If the solubility limit has not been exceeded each section throughout the rubber composition will have essentially the same quantity of the polychlorothiopheneoxide at its surface.

In experiments with the gastropodicidal polychlorothiopheneoxide rubber compositions it has been observed that the rate of release of the active toxicant into the gastropod's habitat can be increased by: increasing the surface area of the composition per unit weight of the composition, increasing the quantity of toxicant in the composition, decreasing the level of carbon black or other fillers in the composition, decreasing the cross link density of the composition, and so forth. Further, it has been observed that the rate of release is affected by the environmental temperature of the gastropod habitat where it is used, the rate of release increasing at higher temperatures. The converse is noted with the opposite of these variables.

Because the polychlorothiopheneoxide rubber compositions release toxicant slowly they are effective over extended periods as for example, months and sometimes years. In addition, because they release toxicant continuously, it is possible to utilize lower concentrations of the polychlorothiopheneoxide compound in the snail's environment that must be used with conventional gastropodicide distribution methods. For example, 0.1 to 1.0 ppm or even less of a continuous dosage of the polychlorothiopheneoxides, while not immediately toxic, will eventually kill gastropods upon sustained long term exposure, such as after 10 to 60 days exposure, when released from polychlorothiopheneoxide-containing rubber compositions. Even lower continuous dosages of the polychlorothiopheneoxide would be necessary to kill the gastropod eggs. Because of this, it is possible to control undesired gastropods usually without serious effect to other desirable plant and animal life coexisting in the gastropod's habitat. Additionally, the use of low concentration of toxicant minimizes avoidance reaction of gastropods, thus enhancing the effectiveness of the polychlorothiopheneoxides.

The polychlorothiopheneoxide gastropodicidal rubber compositions may be used in many different ways. For example, they can be distributed in and about the snail's habitat, either aqueous or terrestrial, as pellets, chunks, tapes, strips, thin sheets, or applied to rocks as a coating. Because of the many variables inherent in any gastropod control program as heretofore described, the quantities of such rubber compositions cannot be universally quantified, it being necessary to empirically determine the optimum for any given situation. In this connection U.S. Pat. Nos. 3,417,181 and 3,639,583 provide detailed disclosures on methods of using biocidal rubber compositions and their advantages as well as their compounding and state of cures. These patents are incorporated herein by reference for these teachings which, while generally equally applicable to the polychlorothiopheneoxide rubber compositions used in the practice of this invention are not to be construed as limiting the scope of the invention hereinafter claimed.

EXAMPLES 1–13

The polychlorothiopheneoxide compounds shown in Table 1 were tested for gastropodicidal activity against *Biomphalaria glabrata* M-line, a cross between snails from Puerto Rico and Bahia, Brazil, which were in excess of 6 weeks of age and had shell diameters ranging from 4–10 mm. *Biomphalaria glabrata* is considered to be the principal vector for *Schistosoma mansoni* flukes in the Western Hemisphere and in Africa. Four or five of the test snails were placed in 10 oz. plastic cups containing 200 milliliters of artificial hard water innocuous to the test snails, made by adding 0.104 g. of $CaCl_2$ and 0.26 g. of $MgSO_4 \cdot 7H_2O$ per liter to deionized water.

Test concentrations of 5 ppm and 0.5 ppm were made by adding dilute dimethylsulfoxide (DMSO) solutions of the polychlorothiopheneoxide compounds to the plastic cups in a quantity providing the desired concentration of the test compound (concentration of DMSO was 0.1% or less).

The snails were subjected to the test compounds for 24 hours at an ambient temperature of about 21°C and then removed, washed, placed in new cups containing the artificial hard water for 24 hours at which time mortality was determined. Results of these screening tests are shown in Table 1 wherein the percent mortalities at the two test concentrations are reported.

EXAMPLE 14

The ovicidal properties of the polychlorothiopheneoxide compounds against gastropod eggs were determined by exposing two day old *Biomphalaria glabrata* eggs, removed from breeding tanks and placed in treated aquarium water, to 0.1 ppm of 3,3,4,4-tetrachlorotetrahydrothiophene-1,1-dioxide for 24 hours and then removing the eggs from the toxic water and placing them in non-toxic water. No hatching of the *Biomphalaria glabrata* eggs was observed during the following 30 day period. Control unexposed eggs, on the other hand, gave 95 to 98% hatching during the normal 9 to 12 day incubation period.

EXAMPLE 15

The effectiveness of the polychlorothiopheneoxide compounds against amphibious snails was demonstrated by distributing 0.2 gms of 3,3,4,4-tetrachlorotetrahydrothiophene-1,1-dioxide powder over 80 square-inch plats of moist soil infested with ten (per plat) *Oncomelania formosa*, one of the principal gastropod vectors of *Shistosoma japonica* that is endemic to Japan, China and surrounding countries. *Oncomelania formosa* is extremely difficult to control because of its propensity to spend most of its time living in moist soil rather than in water. In three test plats it was observed that all thirty test snails were killed within one week. By comparison, in three identical control plats, only four of thirty snails had died after one week.

EXAMPLES 16, 17 and 18

The long-term gastropodicidal activity exhibited by polychlorothiopheneoxide compounds incorporated into rubber matrices was demonstrated by admixing 3,-3,4,4-tetrachlorotetrahydrothiophene-1,1-dixoide into the Examples 16, 17 and 18 rubber compositions shown in Table 2 using conventional rubber mixing techniques. Standard 6 × 6 × 0.075 inch tensile sheets, cured 30 minutes at 290°F, were prepared from each of the rubber compositions and tested as follows.

Discs having a diameter of 0.75 cm. were cut from the tensile sheets prepared from the Examples 16 and 17 rubber compositions and placed in glass jars containing 3,000 mls. of water that had been preconditioned over limestone (one disc per jar). Every few days the water was replaced with an equal volume and type of water. At the end of the twenty-third day, the water was replaced and 10 adult Biomphalaria glabrata snails were added to each jar and exposed for 48 hours. Both the Example 16 and 17 rubber compositions causes 67% mortality after 24 hours and 100% mortality after 48 hours based on survival tests of 30 snails (3 jars) for each composition.

Similarly, 0.75 cm. diameter discs were cut from the tensile sheet prepared from the Example 18 rubber composition and placed in jars (one disc per jar) containing 3,000 ml. of waters having different pH and mineral content which were replaced daily. The quantity of the 3,3,4,4-tetrachlorotetrahydrothiophene-1,1-dioxide released by the Example 18 compound was periodically assayed by determining the loss of weight of the test discs at intervals during the immersion test. Based on this analysis it was calculated that the Example 18 rubber composition was releasing the polychlorothiopheneoxide gastropodicide at the average rates shown in Table 3 during the three month period. These data indicate that the polychlorothiopheneoxide compounds can be introduced continuously into the habitat of gastropods over a long period when incorporated into suitable vulcanized rubber compounds and further, that the release rates of such compounds are not grossly affected by the type of water in which they are employed.

A one gram sample of the vulcanized Example 18 Neoprene compound when added to 2,000 ml. of water in which 25 Biomphalaria glabrata snails were living caused 40 percent mortality within 24 hours and 100% mortality within 67 hours.

The effect of the Example 18 vulcanized compound against Biomphalaria glabrata was further tested in a semi-field test on the Island of St. Lucia by evenly distributing eight 1 cm. square pieces of the compound on top of mud 2 inches thick held in a 2 feet by 4 feet pan inhabited by native St. Lucian snails. Within one day, 7 of 30 snails inhabiting the pan were dead, while after two days 31 of 32 snails found in the pan were observed to be dead. In control tests none of 29 snails inhabiting an identical test pan were found dead. The native snails are normally considered to be three to four times more hardy, and hence difficult to kill, than laboratory grown snails. Further, snails browsing on mud, are more difficult to kill as compared to those in water because it is difficult to disperse the gastropodicide uniformly throughout the habitat of the snails.

Persistency of the Polychorothipheneoxide Compounds

The persistency of the polychlorothiopheneoxide compounds in aqueous environments simulating those encountered in rivers, lakes, ponds, etc. where they would be employed as gastropodicides was determined in the following tests.

In the first test, aqueous solutions of 3,3,4,4-tetrachlorotetrahydrothiophene-1,1-dioxide (50 mg/L) prepared in water buffered to a pH of 7, to simulate pH conditions encountered in most natural bodies of water, were subjected to aeration or UV irradiation (2,537 to 3,660 angstroms, radiation frequencies present in natural sunlight), or both aeration and UV irradiation. From analytically determined changes in the concentrations of the compound, it was calculated that the 3,3,4,4-tetrachlorotetrahydrothiophene-1,1-oxide had an approximate half life of 70 days when aerated, 13 hours when UV irradiated, and 8 hours when both aerated and UV irradiated. The degradation products of this polychlorothiopheneoxide exposed to aeration and UV irradiation conditions like those used in the above test were determined to be nontoxic to rainbow trout and bluegills at levels appreciably higher than would ever be present when the compound is used for gastropod control.

In a second test, the rate of biodegration of the 3,3,4,4-tetrachlorotetrahydrothiophene-1,1-dioxide compound was determined by the Soap and Detergent Association's ABS/LAS Biodegradability test (J. Am. Oil Chem. Soc. 42, No. 11, 1965) using activated sludge as the microbial culture source. It was determined that the compound dissolved in an aqueous solution at a concentration of 25 ppm had a half-life in the range of 16 to 17 days and was more than 95% reduced after 63 days.

While both degradation tests employed conditions that were more severe than would normally be encountered in a natural situation, they establish that the polychlorothiopheneoxides do degrade under conditions typically present in habitats where gastropods are to be controlled by the practice of this invention, thus alleviating cumulative toxication problems of the environment.

TABLE 1

Gastropodicidal Activity of Polychlorothiopheneoxide Compounds

| Example | Compound | Percent Mortality of At 5 ppm * | Biomphalaria glabrata at 0.5 ppm |
|---|---|---|---|
| 1 | 2,3,4-trichlorotetrahydrothiophene-1,1-dioxide | 100 | 0 |
| 2 | 3,3,4,4-tetrachlorotetrahydrothiophene-1,1-dioxide | 100 | 20 |
| 3 | 2,3,3,4,4,-pentachlorotetrahydrothiophene-1,1-dioxide | 100 | 20 |
| 4 | 2,3,3,4,4,5-hexachlorotetrahydrothiophene-1,1-dioxide | 100 | 43 |
| 5 | 3,4-dichloro-2,3-dihydrothiophene-1,1-dioxide | 40 | 0 |
| 6 | 3,3,4-trichloro-2,3-dihydrothiophene-1,1-dioxide | 100 | 80 |
| 7 | 2,3,4-trichloro-2,3-dihydrothiophene-1,1-dioxide | 100 | 40 |
| 8 | 2,3,3,4-tetrachloro-2,3-dihydrothiophene-1,1-dioxide | 100 | 60 |
| 9 | 2,3,4-trichloro-2,5-dihydrothiophene-1,1-dioxide | 100 | 20 |
| 10 | 2,3,4,5-tetrachloro-2,5-dihydrothiophene-1,1-dioxide | 100 | 80 |
| 11 | 3,4-dichlorothiophene-1,1-dioxide | 100 | 0 |
| 12 | 2,3,4-trichlorothiophene-1,1-dioxide | 100 | 80 |
| 13 | 2,3,4,5-tetrachlorotetrahydrothiophene-1-oxide | 80 | 0 |
| Control | 0.5% dimethylsulfoxide in water | 0 | 0 |

* parts per million

TABLE 2

Example 16, 17 and 18 Rubber Compositions

| Ingredient | Ex.16 | Ex.17 | Ex.18 |
| --- | --- | --- | --- |
| cis-polyisoprene | 100 | | |
| cis-polybutadiene | | 100 | |
| Neoprene WRT | | | 100 |
| FEF Carbon Black | 15.0 | 15.0 | |
| HAF Carbon Black | | | 15.0 |
| Sulfur | 1.5 | 1.5 | |
| 2-Mercaptobenzothiazole | 1.0 | 1.0 | |
| Zinc Oxide | 1.0 | 1.0 | 5.0 |
| Magnesium Oxide | | | 4.0 |
| Benzothiazyl Disulfide | | | 1.0 |
| Phenyl-β-Naphthylamine | | | 1.0 |
| Lauric Acid | | | 3.0 |
| 3,3,4,4-tetrachlorotetrahydro-thiophene-1,1-dioxide | 10.0 | 10.0 | 20.0 |

TABLE 3

Rate of Release of 3,3,4,4-Tetrachlorotetrahydrothiophene-1,1-dioxide from the Example 18, Rubber Composition in Various Kinds of Water

| Kind of Water | Release Rate (micrograms/day/cm$^2$) |
| --- | --- |
| pH 6 | 129 |
| pH 8 | 141 |
| High Mineral Content | 131 |
| Low Mineral Content | 99 |

What is claimed is:

1. A method of controlling gastropods which comprises exposing the gastropods to a gastropodicidal quantity of a polychlorothiopheneoxide compound corresponding to the formula

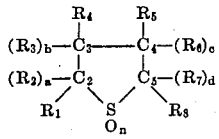

wherein $R_1$, $R_2$, $R_3$, $R_4$, $R_5$, $R_6$, $R_7$ and $R_8$ are hydrogen or chlorine radicals, $n$ is 1 or 2, and $a$, $b$, $c$ and $d$ are 0 or 1, with the provisos that at least two of the R substituents are chlorine radicals, that the sum of $a$, $b$, $c$ and $d$ is 0, 2 or 4, that when the sum of $a$, $b$, $c$ and $d$ is 2 there is a double bond either between $C_3$ and $C_4$ or between $C_4$ and $C_5$, and that when the sum of $a$, $b$, $c$ and $d$ is 0 there are double bonds between $C_2$ and $C_3$ and between $C_4$ and $C_5$.

2. The method of claim 1 wherein the gastropods are vectors of flukes parasitic to man and animals.

3. The method of claim 2 wherein the gastropodicidal quantity of the polychlorothiopheneoxide compound is released from a rubber composition containing the compound.

4. The method of claim 1 wherein $n$ is 1 and the sum of $a$, $b$, $c$ and $d$ is 4.

5. The method of claim 1 wherein $n$ is 2.

6. The method of claim 5 wherein the sum of $a$, $b$, $c$ and $d$ is 4.

7. The method of claim 6 wherein $R_1$ and $R_8$ are hydrogen radicals.

8. The method of claim 5 wherein the sum of $a$, $b$, $c$ and $d$ is 2 and there is a double bond between $C_3$ and $C_4$.

9. The method of claim 5 wherein the sum of $a$, $b$, $c$ and $d$ is 2 and there is a double bond between $C_4$ and $C_5$.

10. The method of claim 5 wherein the sum of $a$, $b$, $c$ and $d$ is 0.

11. The method of claim 1 wherein the polychlorothiopheneoxide is a compound selected from the group consisting of:

2,3,4-trichlorotetrahydrothiophene-1,1-dioxide,
3,3,4,4-tetrachlorotetrahydrothiophene-1,1-dioxide,
2,3,3,4,4-pentachlorotetrahydrothiophene-1,1-dioxide,
2,3,3,4,4,5-hexachlorotetrahydrothiophene-1,1-dioxide,
3,4-dichloro-2,3-dihydrothiophene-1,1-dioxide,
3,3,4-trichloro-2,3-dihydrothiophene-1,1-dioxide,
2,3,4-trichloro-2,3-dihydrothiophene-1,1-dioxide,
2,3,3,4-tetrachloro-2,3-dihydrothiophene-1,1-dioxide,
2,3,4-trichloro-2,5-dihydrothiophene-1,1-dioxide,
2,3,4,5-tetrachloro-2,5-dihydrothiophene-1,1-dioxide,
3,4-dichlorothiophene-1,1-dioxide,
2,3,4-trichlorothiophene-1,1-dioxide, and
2,3,4,5-tetrachlorotetrahydrothiophene-1-oxide.

12. The method of claim 11 wherein the gastropods are vectors of flukes parasitic to man and animals.

13. The method of claim 12 wherein the gastropodicidal quantity of the polychlorothiopheneoxide compound is released from a rubber composition containing the compound.

14. The method of claim 1 wherein the polychlorothiopheneoxide is 3,3,4,4-tetrachlorotetrahydrothiophene-1,1-dioxide.

15. The method of claim 14 wherein the gastropods are vectors of flukes parasitic to man and animals.

16. The method of claim 14 wherein the gastropods are vectors of schistosomes.

17. The method of claim 15 wherein the gastropodicidal quantity of the polychlorothiopheneoxide compound is released from a rubber composition containing the compound.

18. A method of controlling gastropods which are vectors of flukes parasitic to man and animals which comprises exposing the eggs of the gastropods to an ovicidal quantity of a polychlorothiopheneoxide compound corresponding to the formula

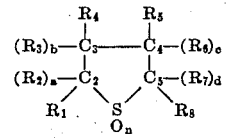

wherein $R_1$, $R_2$, $R_3$, $R_4$, $R_5$, $R_6$, $R_7$ and $R_8$ are hydrogen or chlorine radicals, $n$ is 1 or 2, and $a$, $b$, $c$ and $d$ are 0 or 1, with the provisos that at least two of the R substituents are chlorine radicals, that the sum of $a$, $b$, $c$ and $d$ is 0, 2 or 4, that when the sum of $a$, $b$, $c$ and $d$ is 2 there is a double bond either between $C_3$ and $C_4$ or between $C_4$ and $C_5$, and that when the sum of $a$, $b$, $c$ and $d$ is 0 there are double bonds between $C_2$ and $C_3$ and between $C_4$ and $C_5$.

19. The method of claim 18 wherein the ovicidal quantity of the polychlorothiopheneoxide compound is released from a rubber composition containing the compound.

20. The method of claim 18 wherein the polychlorothiopheneoxide is a compound selected from the group consisting of:

2,3,4-trichlorotetrahydrothiophene-1,1-dioxide,
3,3,4,4-tetrachlorotetrahydrothiophene-1,1-dioxide,
2,3,3,4,4-pentachlorotetrahydrothiophene-1,1-dioxide,
2,3,3,4,4,5-hexachlorotetrahydrothiophene-1,1-dioxide,
3,4-dichloro-2,3-dihydrothiophene-1,1-dioxide,
3,3,4-trichloro-2,3-dihydrothiophene-1,1-dioxide,
2,3,4-trichloro-2,3-dihydrothiophene-1,1-dioxide,
2,3,3,4-tetrachloro-2,3-dihydrothiophene-1,1-dioxide,
2,3,4-trichloro-2,5-dihydrothiophene-1,1-dioxide,
2,3,4,5-tetrachloro-2,5-dihydrothiophene-1,1-dioxide,
3,4-dichlorothiophene-1,1-dioxide
2,3,4-trichlorothiophene-1,1-dioxide, and
2,3,4,5-tetrachlorotetrahydrothiophene-1-oxide.

21. The method of claim 20 wherein the ovicidal quantity of the polychlorothiopheneoxide compound is released from a rubber composition containing the compound.

22. The method of claim 18 wherein the polychlorothiopheneoxide is 3,3,4,4-tetrachlorotetrahydrothiophene-1,1-dioxide.

23. The method of claim 22 wherein the ovicidal quantity of the polychlorothiopheneoxide compound is released from a rubber composition containing the compound.

* * * * *